April 15, 1924.
C. BARTON
MOTOR VEHICLE BUMPER
Filed Dec. 13, 1923
1,490,580
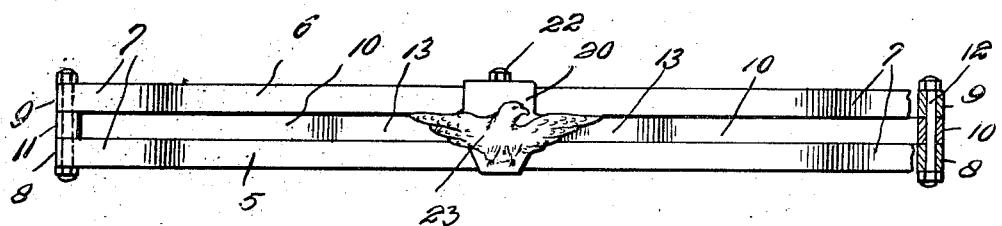
Fig. 1.
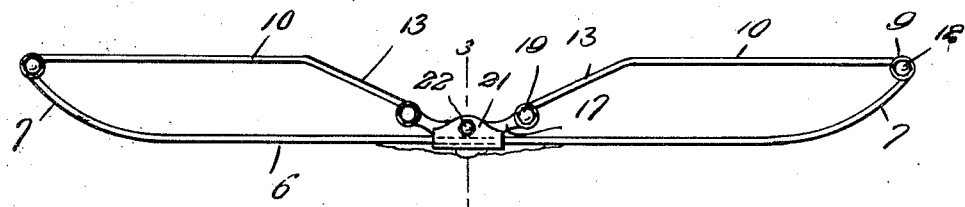
Fig. 2.
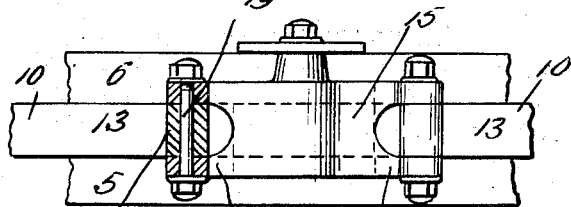
Fig. 3.
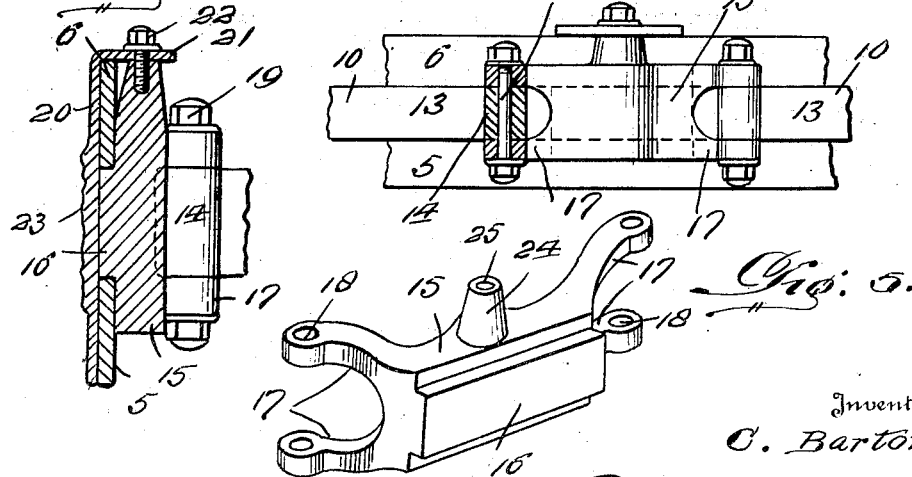
Fig. 4.
Fig. 5.
Inventor
C. Barton,
By Clarence A. O'Brien
Attorney Patented Apr. 15, 1924.

1,490,580

UNITED STATES PATENT OFFICE.

CHARLES BARTON, OF JACKSONVILLE, FLORIDA.

MOTOR-VEHICLE BUMPER.

Application filed December 13, 1923. Serial No. 680,471.

*To all whom it may concern:*

Be it known that I, CHARLES BARTON, a citizen of the United States, residing at Jacksonville, in the county of Duval and State of Florida, have invented certain new and useful Improvements in Motor-Vehicle Bumpers, of which the following is a specification.

This invention relates to certain new and useful improvements in bumpers for motor vehicles and has particular reference to bumpers of the horizontal bar type, adapted to be mounted transversely in front or at the rear of the vehicle and to be supported by the chassis or frame of the latter.

The primary object of the invention is to generally simplify and improve bumpers of the above kind, whereby the same will be extremely simple and durable in construction as well as efficient in operation, and so as to thereby meet with all of the requirements for a successful commercial use.

Another object of the invention is to provide a simple and durable form of bumper of the above type which will not readily get out of order and that will effectively absorb shock as well as present a neat and pleasing appearance when in use.

Other objects will become apparent as the nature of the invention is better understood, and the same consists in the novel form, combination, and arrangement of parts hereinafter more fully described, shown in the accompanying drawing and claimed.

In the drawing, wherein like reference characters indicate corresponding parts throughout the several views:

Figure 1 is a front elevational view, partly broken away and in section of a bumper constructed in accordance with the present invention.

Figure 2 is a top plan view of the device shown in Figure 1.

Figure 3 is an enlarged transverse sectional view taken substantially upon the line 3—3 of Figure 2.

Figure 4 is a fragmentay view, drawn on a larger scale, and showing the central portion of the bumper partly in rear elevation and partly in vertical section, and Figure 5 is an enlarged perspective view of the rear bar connector and slide block or casting.

Referring more in detail to the drawing, the present invention comprises a pair of similar resilient horizontal front bars 5 and 6 that are disposed in spaced parallel superposed relation and formed with rearwardly curved or rearwardly directed ends as at 7, these bars being of uniform width from end to end and adapted to be disposed in a horizontal position to extend transversely of the vehicle at the front or rear thereof in the usual well known manner.

The free end portions of the front bars 5 and 6 terminate in vertical eyes 8 and 9 respectively, each eye 8 of the lower bar 5 being aligned with the eye 9 upon the adjacent end of the bar 6. A pair of similar rear horizontal bars 10 are provided behind the bars 5 and 6 in a horizontal plane registering with the space between the bars 5 and 6, as shown clearly in Figure 4, and these bars 10 are of resilient material and preferably of substantially uniform width from end to end. The outer ends of the rear bars 10 are return bent to form eyes 11, one of which is disposed between and vertically aligned with the eyes 8 and 9, and at one end of the bumper, and the other of which is similary related to the eyes 8 and 9 at the other end of the bumper. A bolt 12 passes through the aligned eyes 8, 9 and 11 at each end of the bumper, and these bolts have nuts or the like secured thereon to maintain all of the bars in their assembled relation, as shown, with the outer ends of the bars 10 pivotally attached to and between the outer ends of the bars 5 and 6, the eyes 11 of said bars 10 thereby providing means for effectively spacing the bars 5 and 6.

As shown clearly in Figures 2, 3, and 4, the bars 10 terminate in inwardly extending and forwardly converging inner end portions 13, the free ends of which are formed to provide eyes 14 disposed adjacent to and at opposite sides of the longitudinal centers of the bars 5 and 6 as well as at a point adjacent to or directly behind said bars 5 and 6 as shown.

The invention embodies a member for connecting the inner ends of the bars 10, and associated with the bars 5 and 6 for relieving the rear bars of strains tending to vertically displace said bars 10 relative to the bars 5 and 6 or vice versa, and this member is preferably in the nature of a casting as shown in Figure 5, including a body portion 15 that is formed upon its front face with a horizontal longitudinal guide rib 16 that is of a form to snugly slidably fit between the adjacent centers of the bars 5 and 6 as shown clearly in Figure 3. The body 15 is formed upon its opposite ends with rearwardly diverging pairs of superposed spaced horizontal arms 17, the free ends of which are provided with vertically aligned openings 18. The arms 17 are spaced apart for a distance substantially equal to the width of the bars 10 or the length of the eyes 14 thereof, and each eye 14 fits between a pair of the arms 17 in alignment with the openings 18 of the latter, while bolts 19 pass through the openings 18 of each pair of arms 17 and through the eye 14 disposed between said arms whereby the inner ends of the bars 10 are pivotally attached to the connector, nuts or the like being disposed or secured upon the bolt 19 for maintaining the parts assembled at this point. By reason of this construction, the inner ends of the bars 10 may assume different angular relations to the pairs of arms 17 and the combined slide and bar connector may be displaced within certain limits in a horizontal direction longitudinally of and between the bars 5 and 6. These features in combination with the resiliency of the several bars and the possibility of the outer ends of the bars 5 and 6 changing their angular relations to the rear bars 10 at the outer ends of the latter, insure superior shock absorbing effects without undue or damaging strain upon any part or parts of the bumper. Also, by reason of the rib 16 extending forwardly between the adjacent edges of the bars 5 and 6, relative vertical displacement between the bars 5 and 6 and the rear bars 10 is effectively prevented for relieving said bars from strains in this direction.

A face plate 20, preferably forming part of an ornamental casting, as shown, is disposed in front of the intermediate portions of the bars 5 and 6, and directly in front of the body portion 15 of the bar connector, the face plate 20 being provided with a flat rear surface which flatly engages the front surfaces of the bars 5 and 6 and the flat front surface of the rib 16 as shown in Figure 3. This face plate is of sufficient size to substantially completely conceal the bar connector including the body 15 so that a neat appearance will be had even though said bar connector be a rough casting. Rigid with the upper end of the face plate 20 and extending rearwardly therefrom across the upper edge of the upper front bar 6 is a horizontal apertured plate or ear 21 that is rigidly attached to the body 15 of the bar connector by means of a stud screw or bolt 22. In this manner, rearward displacement of the body 15 such as would result in displacement of the rib 16 from between the bars 5 and 6 is effectively prevented with the front face of the body 15 above and below the rib 16 maintained in contact with the adjacent portions of the rear surfaces of the bars 5 and 6 and with the rear surface of the plate 20 in contact with the front surfaces of the bars 5 and 6, as well as movable thereon. The ornamentation of the face plate may be of any preferred or desired form and is generally indicated at 23. For facilitating the connection of the ear 21 of the face plate 20 to the body 15, the latter may be provided upon its upper edge with an upstanding boss 24 having a threaded socket 25, into which the bolt or screw 22 is threaded. However, the specific manner of attaching the plate 20 to the bar connector including the body 15 may be greatly varied without departing from the spirit of the invention.

From the foregoing, it will be seen that the body 15 and plate 20 form a U-shaped slide embracing or engaging the front and rear surfaces of the bars 5 and 6 and slidable longitudinally along the latter.

From the foregoing description, it is believed that the manner in which shocks and jars will be effectively absorbed by the present device will be readily understood and appreciated by those skilled in the art.

Minor changes may be made without departing from the spirit and scope of the invention as claimed.

What I claim as new is:

An automobile bumper of the character described comprising a pair of horizontal resilient cross bars arranged in superimposed spaced relation and terminating in rearwardly directed end portions, a pair of rear resilient cross bars having adjacent inner end portions arranged in inwardly extending forwardly converging relation, means pivotally connecting the outer ends of the rear bars to the ends of the first named bars upon vertical axes, a bar connecting member having its ends pivotally connected to the inner ends of the rear bars upon vertical axes and provided with a forwardly projecting rib slidably disposed between adjacent edges of the first named bars, and an ornamental face plate engaging the front surfaces of the first named bars in front of said bar connecting member and its rib and rigidly connected to the bar connecting member to maintain the same with its rib disposed between the first named bars.

In testimony whereof I affix my signature.

CHARLES BARTON.